Patented Aug. 18, 1953

2,649,453

UNITED STATES PATENT OFFICE 2,649,453

PREPARATION OF SOLUBLE VAT DYES OF THE ACRIDONE SERIES

Elizabeth M. Hardy and William B. Hardy, Bound Brook, N. J., assignors to American Cyanamid Company, New York, N. Y., a corporation of Maine No Drawing. Application January 17, 1951, Serial No. 206,517

7 Claims. (Cl. 260—276)

This invention relates to a method of preparing water-soluble sulfuric acid half-esters of leuco dyestuffs of the anthraquinone acridone series. Soluble esters, or indigosols, of this type have become very important in the dyestuff industry, and a number of processes have been developed for their preparation. Nevertheless, the art discloses, heretofore, no practical method for esterifying dyes of the anthraquinone acridone series, of which one of the most important is anthraquinone-1(N),2-naphthacridone of the formula:

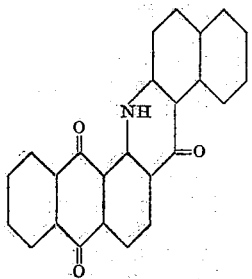

Although a number of processes have been described which purport to give some leuco sulfuric esters of this and other acridones, they all produce products of unknown constitution and of such low stability to storage, that this important family of vat dyes has not been commercially available in the form of sulfuric esters.

In our copending application Serial No. 206,516 filed January 17, 1951, we describe and claim disulfuric acid half-esters of the leuco vat dyestuffs of the anthraquinone acridone series and an anhydrous process of preparing them. There is also described but not claimed, an aqueous process which forms the subject matter of the present invention.

Aqueous processes for the formation of sulfuric acid half-esters of ordinary leuco vat dyestuffs under mildly alkaline conditions i. e., a pH not exceeding 11.5 are described and claimed in the copending application of Hardy et al., Serial No. 175,664, filed July 24, 1950.

In the present invention, however, this process is applied not to the leuco dyestuff itself, but to the intermediate 1-arylamino-2-carboxyanthraquinone corresponding to the dyestuff desired. Reduction, esterification and cyclization occur in the same reaction medium, producing in good yield the disulfuric half-esters of the dyestuff, which esters can easily be recovered and are suited for dyeing vegetable and animal fibers by the procedures well-known in the art for use with sulfuric half-esters of other leuco vat dyes.

The mechanism of the present process is not fully known, and consequently it is not desired to limit this invention to any specific theory of action. It does, however, seem probable that reduction and esterification precede, and somehow facilitate, cyclization.

It is an advantage of the present invention that it does not require any special techniques, but is based on the well-known procedures of aqueous esterification, modified as described in the aforementioned copending application. Although it is often convenient to carry out vatting and esterification simultaneously as described in this application, it is not strictly necessary. It is possible, for example, to vat the intermediate in a strongly alkaline solution, then buffering it to mild alkalinity for the esterification step. Good results are also obtained by this procedure.

This procedure is broadly applicable to intermediates of the formula

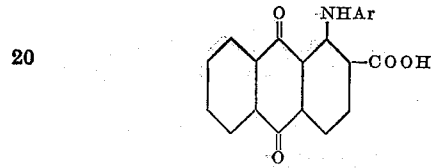

in which Ar is an isocyclic aromatic radical, particularly of the benzene or naphthalene series, containing a free position ortho to the —NH— linkage to make acridone cyclization possible. Typical examples of these intermediates are 1-anilino-2-carboxyanthraquinone; its substitution products such as the 1-p-anisidino and 1-p-toluidino-2-carboxyanthraquinone; products substituted in the anthraquinone nucleus, such as 6-chloro - 1-anilino - 2 - carboxyanthraquinone, 5-benzoylamino-1-p-toluidino - 2 - carboxyanthraquinone; and 1 - naphthylamino - 2 - carboxyanthraquinone and its substitution products. In general, if the arylamino radical is too heavily substituted by deactivating groups such as halogeno, these tend to impede cyclization and reduce the yields and ease of reaction.

The present invention will be further illustrated in the following examples. Parts are by weight unless otherwise specified.

*Example 1*

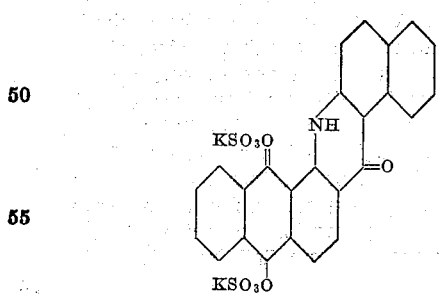

A mixture of 98 parts of 1-(β-naphthylamino)-2-carboxyanthraquinone, 400 parts of water, 212 parts of sodium carbonate, 10 parts of dimethylaniline, and 100 parts of 40% sodium xylene sulfonate solution is stirred in a nitrogen atmosphere at 50° C. and treated at this temperature with 58 parts of sodium hydrosulfite and 272 parts of the sulfur trioxide addition product of triethylamine. After all the addition product has been added, the reaction mixture is stirred until reaction is complete, treated with 60 parts of 20% sodium hydroxide solution, and freed of triethylamine and dimethylaniline by distillation under reduced pressure. The residue is aerated to oxidize any unesterified product, and filtered. The product is salted out from the filtrate by the addition of potassium chloride. The leuco diester thus obtained is washed with 20% potassium carbonate solution and dried.

*Example 2*

To a mixture of 98 parts of 1-(β-naphthylamino)-2-carboxyanthraquinone, 500 parts of water, 212 parts of sodium carbonate and 10 parts of dimethylaniline, there is gradually added at 50° C. under a nitrogen atmosphere, 58 parts of sodium hydrosulfite and 272 parts of the sulfur trioxide compound of triethylamine. After stirring at 50° C. until reaction is complete, the mixture is treated with 600 parts of 20% sodium hydroxide solution and distilled to remove amines. Solids are removed from the residual liquor, which is then salted with potassium chloride. The product which separates is filtered and washed with 20% potassium carbonate solution.

*Example 3*

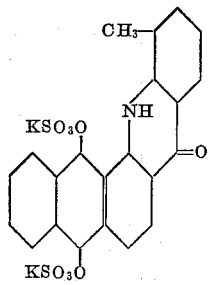

A mixture of 45 parts of 1-(o-toluidino)-2-carboxyanthraquinone, 200 parts of water, 50 parts of 40% sodium xylenesulfonate solution, 7 parts of dimethylaniline and 106 parts of sodium carbonate is stirred in a nitrogen atmosphere at 50° C., and treated with 29 parts of sodium hydrosulfite and 136 parts of the sulfur trioxide addition product of triethylamine. After all the addition product has been added, the reaction mixture is stirred until reaction is complete. The mixture is then treated with 240 parts of 5 N sodium hydroxide solution, freed of triethylamine by distillation, diluted, aerated, and filtered. The product is salted from the filtrate by the addition of potassium chloride, filtered, and dried. It may be purified by redissolving and resalting.

*Example 4*

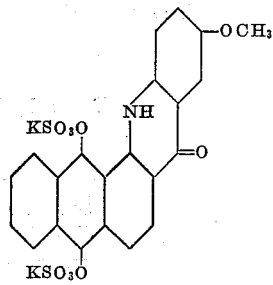

To a mixture of 47 parts of 1-(p-anisidino)-2-carboxyanthraquinone, 200 parts of water, 50 parts of 40% sodium xylenesulfonate solution, 106 parts of sodium carbonate, and 7 parts of dimethylaniline, there is added with stirring under nitrogen, at approximately 50° C., 29 parts of sodium hydrosulfite and 136 parts of the sulfur trioxide addition product of triethylamine. The reaction is continued at 50° C. until it is substantially complete, and the product worked up as described in the preceding example. After filtration, it is washed with 20% potassium chloride-2% potassium hydroxide solution and dried at 35° C.

As is described in the copending application referred above, the sulfur trioxide addition product has to be a strong tertiary amine such as a trialkylamine, the amine having a dissociation constant of at least $1 \times 10^{-7}$ at 25° C.

We claim:

1. A process of converting a 1-arylamino-2-carboxyanthraquinone to the disulfuric ester of the leuco form of the corresponding acridone vat dyestuff, which comprises subjecting the carboxyanthraquinone in aqueous alkaline solution to reduction to its leuco form and reacting the product formed in aqueous alkaline solution with the sulfur trioxide compound of a tertiary amine having a dissociation constant of at least $1 \times 10^{-7}$ at 25° C., the reduction and esterification effected in the foregoing steps resulting a concomitant cyclization of the arylamino carboxyanthraquinone to the corresponding acridone.

2. A process according to claim 1 in which the tertiary amine is a trialkylamine.

3. A process according to claim 2 in which the trialkylamine is triethylamine.

4. A process according to claim 1 in which the 1-arylamino-2-carboxyanthraquinone is 1-(β-naphthylamino)-2-carboxyanthraquinone.

5. A process according to claim 4 in which the pH of the reaction mixture is not above 11.5.

6. A process according to claim 5 in which the tertiary amine is a trialkylamine.

7. A process according to claim 6 in which the trialkylamine is triethylamine.

ELIZABETH M. HARDY.
WILLIAM B. HARDY.

References Cited in the file of this patent

UNITED STATES PATENTS

| Number | Name | Date |
|---|---|---|
| 961,047 | Ullman | June 7, 1910 |
| 1,090,636 | Luttringhaus et al. | Mar. 17, 1914 |
| 2,035,362 | Bauer et al. | Mar. 24, 1936 |
| 2,164,782 | Prahl et al. | July 4, 1939 |
| 2,476,287 | Croft et al. | July 19, 1949 |

FOREIGN PATENTS

| Number | Country | Date |
|---|---|---|
| 407,702 | Great Britain | Mar. 21, 1934 |